Oct. 29, 1935.  W. G. McCOMBE  2,019,428
MACHINE FOR THE MOLDING OF TILES AND THE LIKE
Filed Sept. 28, 1934  5 Sheets-Sheet 3

INVENTOR
WILLIAM G. McCOMBE
By Norris & Bateman
ATTORNEYS

Oct. 29, 1935. W. G. McCOMBE 2,019,428
MACHINE FOR THE MOLDING OF TILES AND THE LIKE
Filed Sept. 28, 1934 5 Sheets-Sheet 4
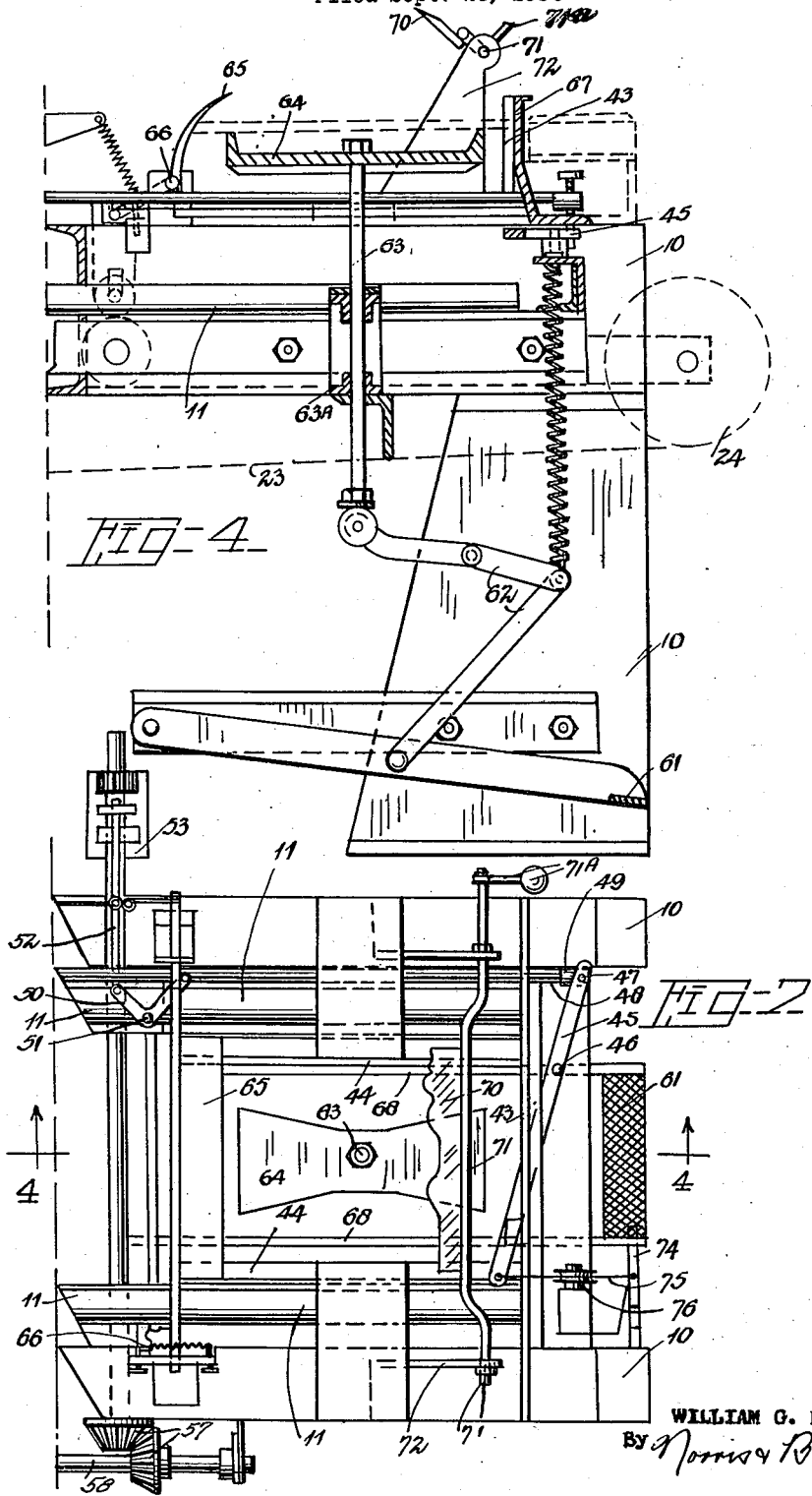
INVENTOR
WILLIAM G. McCOMBE
By Morris & Bateman
ATTORNEYS Oct. 29, 1935. W. G. McCOMBE 2,019,428
MACHINE FOR THE MOLDING OF TILES AND THE LIKE
Filed Sept. 28, 1934 5 Sheets-Sheet 5
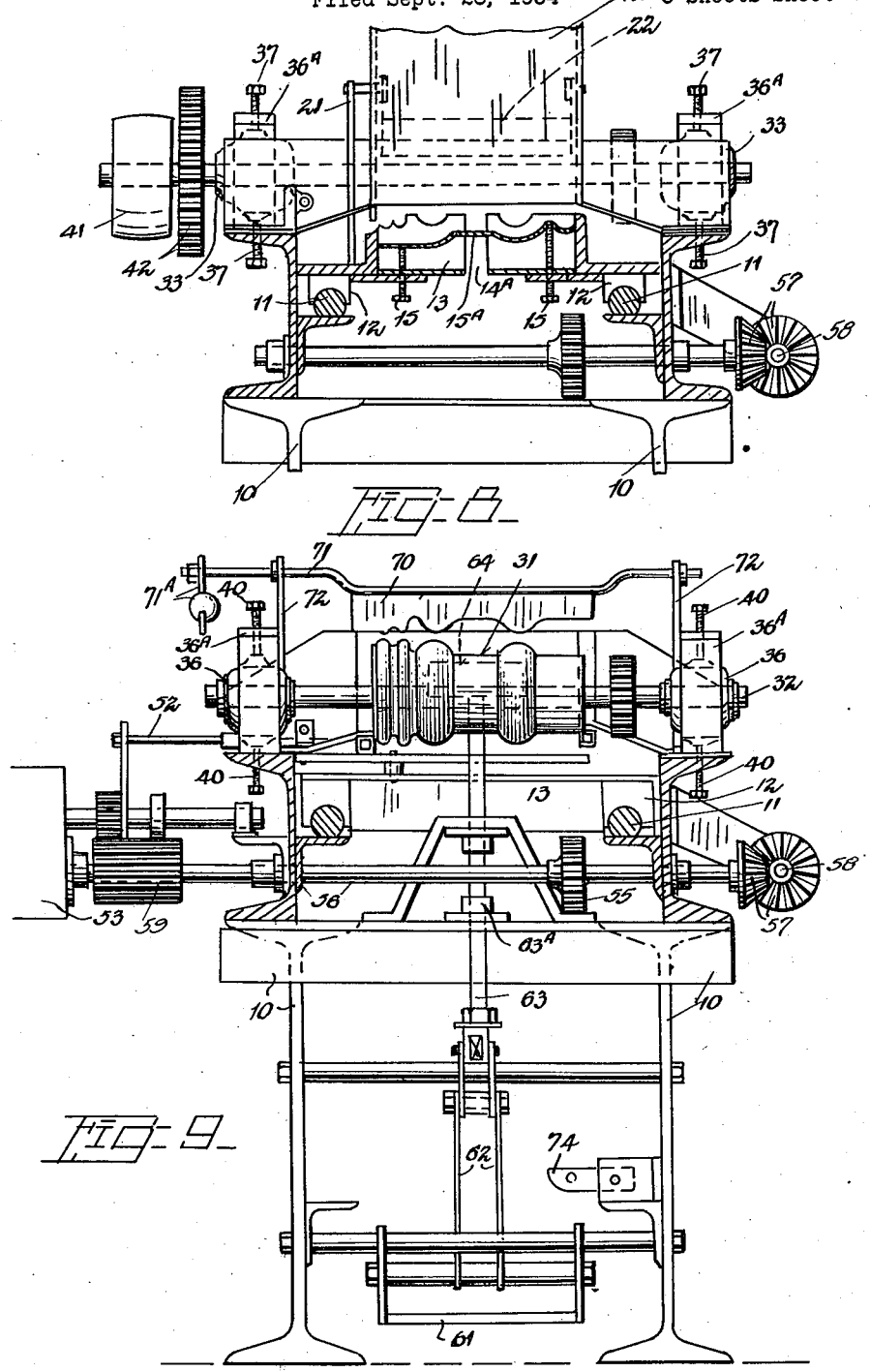
INVENTOR
WILLIAM G. McCOMBE
By Norris & Bateman
ATTORNEYS Patented Oct. 29, 1935

2,019,428

UNITED STATES PATENT OFFICE 2,019,428

MACHINE FOR THE MOLDING OF TILES AND THE LIKE

William Geoffrey McCombe, West Sublaco, Western Australia, Australia

Application September 28, 1934, Serial No. 746,005 In Australia October 12, 1933

10 Claims. (Cl. 25—42)

This invention provides certain improvements in and relating to machines for the molding and manufacture of roofing, paving and building tiles and the like. The said invention by its construction enables the tiles to be quickly, efficiently and uniformly molded, the successive operations being expeditiously carried out. In order however that the invention may be clearly understood, the construction thereof will be described with the aid of the accompanying drawings, in which:—

Fig. 1 is a general side elevation of the machine;

Figs. 2, 3 and 4 together illustrate an enlarged longitudinal sectional elevation of Fig. 1 on the lines 2—2, 3—3 and 4—4 respectively of Figs. 5, 6 and 7;

Figs. 5, 6 and 7 together illustrate a plan view of the machine, on the same scale as Figs. 2, 3 and 4;

Fig. 8 is a part end sectional elevation on the line 8—8 of Fig. 1, but on the same scale as Figs. 2 to 7 inclusive;

Fig. 9 is an end sectional elevation (on the latter-mentioned scale) on the line 9—9 of Fig. 1.

Figure 1:
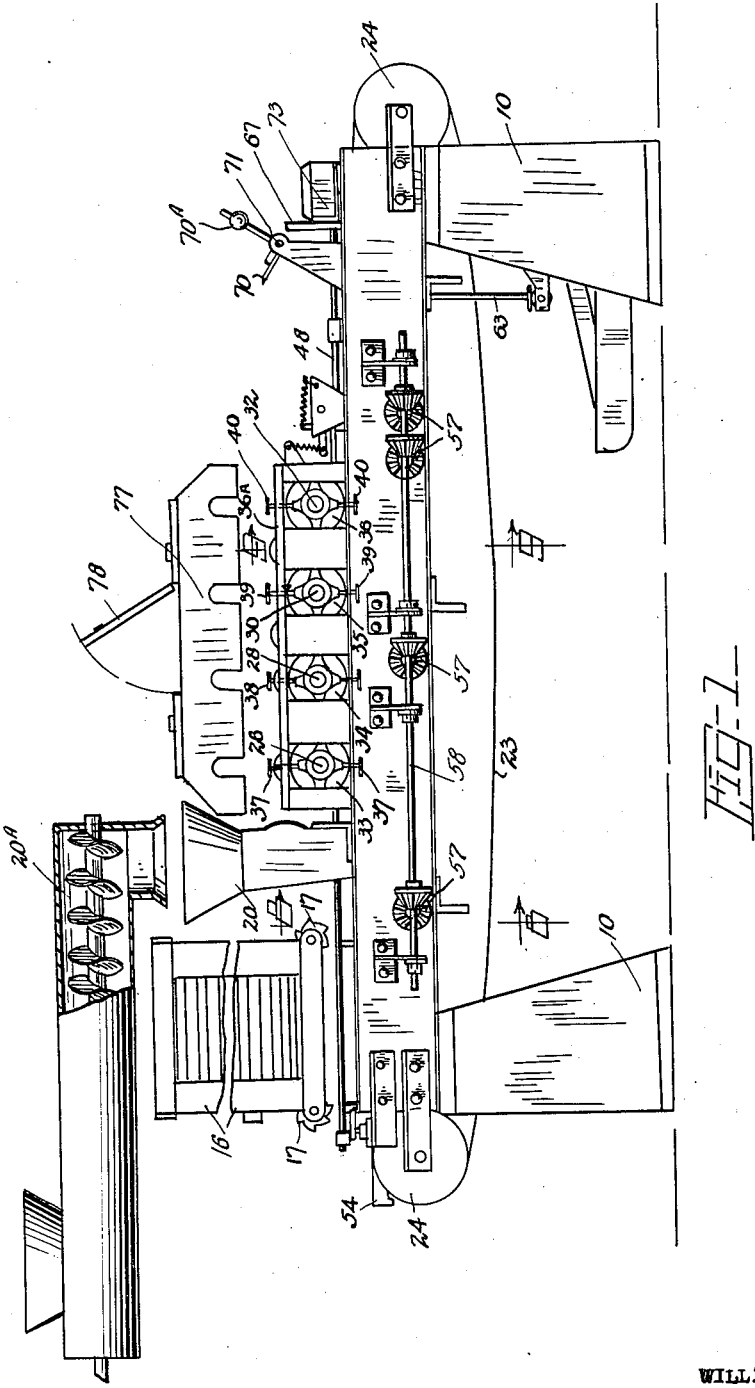
Figure 2:
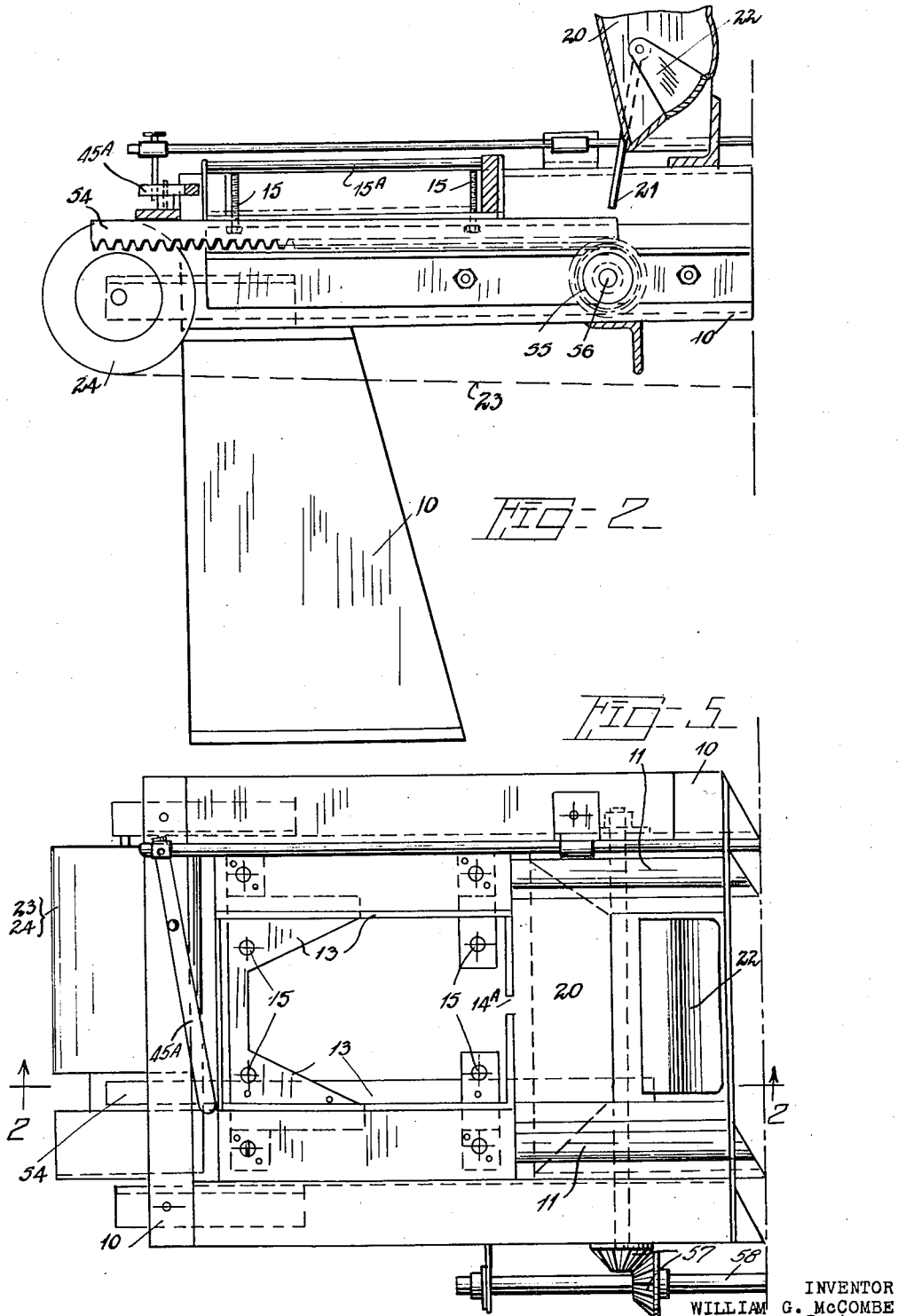
Figure 3:
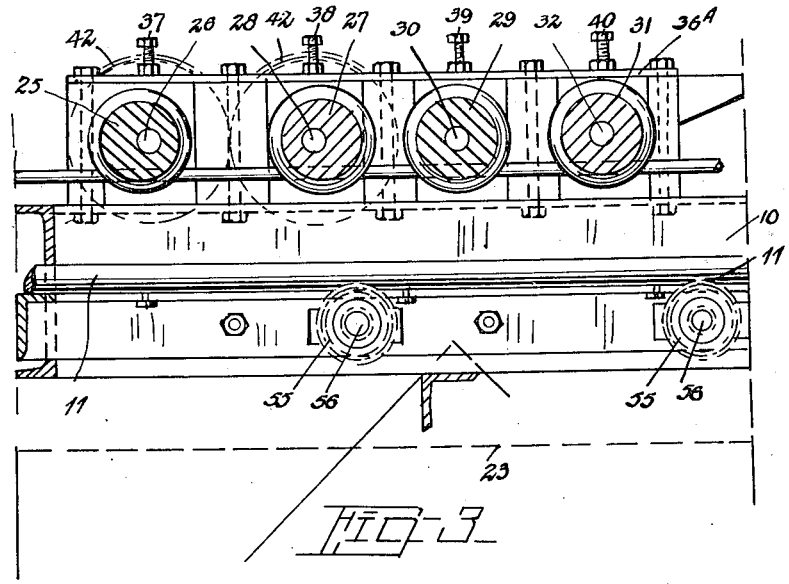
Figure 6:
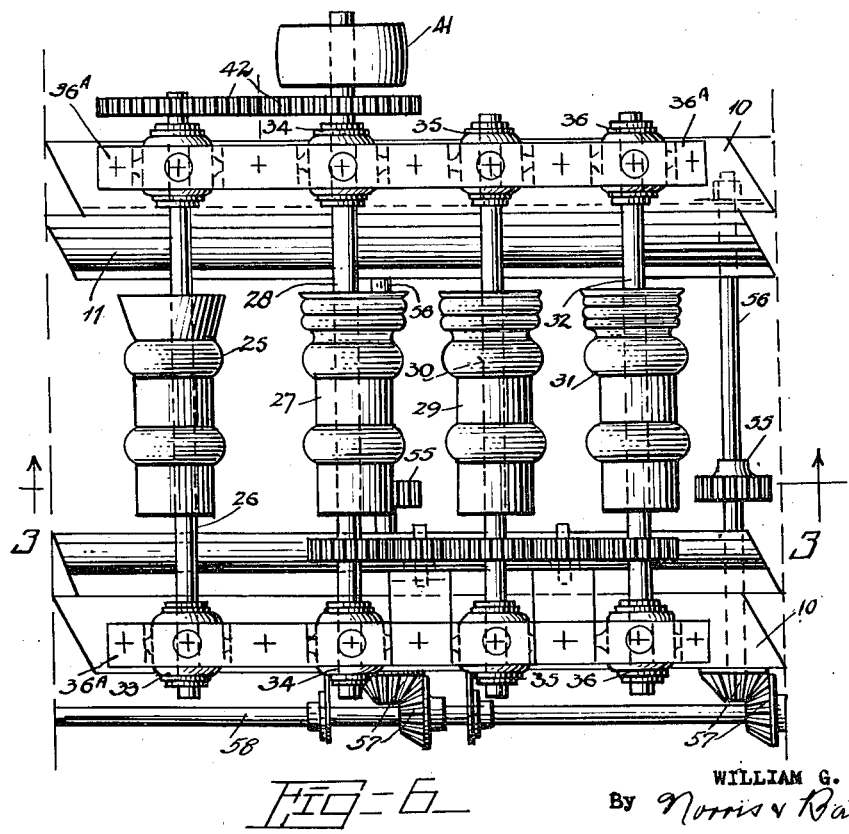

For the sake of clearness certain members have been omitted from each of these views, but same are shown in the companion views. For the sake of further clearness, certain members have been shown diagrammatically.

Referring to the said drawings:—

I employ a standard frame as 10 of an open-spaced, skeleton-like construction. Suitably anchored to and within the said standard frame, are companion side guide rails 11, placed lengthwise with the machine; each thereof being of a semi-circular or other suitable and approved cross-section. Upon these rails 11 are slidably mounted companion shoes as 12, the latter fitted to an open frame 13, herein called the mold frame, which on plan is of the contour of the tile proposed to be molded, while the upper front and rear wall edges 14 of the said frame coincide with the outline of the upper face of the said proposed tile. A slotted opening or gap 14A is made in the said front portion or wall to allow of the said frame to partially fork a vertical rod (63, hereinafter referred to), so that the said frame will be enabled to slide the whole length of its travel along the rails. The said mold frame 13 is spacedly positioned in respect of the main standard frame 10 to ensure the free operation thereof.

In the bottom of the said frame 13 are fitted (for example) four vertically adjustable pins 15 whereon rests a renewable mold plate 15A, which receives the cementitious material for the molding of the proposed tile; the said plate 15A being of the shape of the lower face thereof.

At the loading end of the machine is a supply of these mold plates which are retained in a suitable holder 16. At each end, these plates are held in the horizontal position in the said holder by the prongs of toothed wheels 17. The mold frame 13, as aforesaid is adapted to slide on its rails 11, on the main standard frame 10, and during its progress thereon, it, by lever arm or the like is adapted, when beneath the holder 16 to make contact against a trip lever (not shown) or the like, which action imparts to the toothed wheels 17, a unit of rotation, thus releasing the lowermost mold plate which falls on to, and is retained by the pins 15 in the mold frame 13.

The next uppermost plate in the holder then drops to the position lately occupied therein by the released plate. Upon receiving the said plate, the mold frame slidably passes beneath the feed hopper 20 wherein is contained the cementitious material or the like. This hopper may be fed by hand, or by a spiral conveyor 20A, or otherwise as may be desired. The mold frame, on passing beneath the hopper 20 makes pressing contact against the lever arm 21 to which is attached a pivotal movable door 22 fitted within the said hopper, thus opening latter and allowing of the material therein to gravitate into the mold frame 13.

Upon the latter completing its movement beneath the said hopper 20, it releases the lever arm 21, which allows the said hopper 22 to return to its closed position.

After being filled by the hopper 20 and passing from beneath same, the front lower edge thereof levels the material in the frame, the surplus thereof gravitating over the edge of the frame 13 on to a conveyor belt 23 attached to each end of the frame 13 and passing over rollers 24 positioned at each end of the aforesaid standard frame 10.

After passing from beneath the hopper and being filled and levelled thereby as aforesaid, the mold frame 13 passes under a roller 25 eccentrically mounted in a cam-like manner on a spindle 26, whereby the material in the mold frame is thoroughly rammed therein. This roller rotates at a high speed and in the same direction as that in which the frame is moving so as to ensure an even distribution and thorough ramming of the material therein.

This roller 25 is so shaped as to mold the material to a shape nearly approaching that of the finished tile. The mold frame 13 then passes under another roller 27 also eccentrically mounted in a cam-like manner on a spindle 28 and whereby the material in the mold frame receives an additional ramming. This latter roller rotates at a similar speed, but in the opposite direction from that which the frame 13 is moving, and is also of a shape approximating to that of the finished tile. The mold frame then passes under a further roller 29 concentrically mounted on a spindle 30 and is adapted to further mold the design of the tile. This roller rotates at a similar speed to its companions, and in the opposite direction from that in which the frame is moving. The mold frame 13 then passes under a finishing roller 31 concentrically mounted on its spindle 32, and its purpose is to smooth the upper face of the tile and impart the finishing surface thereto. This roller rotates at a similar speed to that of the aforementioned rollers and is also shaped to the design of the finished tile. As shown in the drawings, these rollers 25, 27, 29 and 31 each differ slightly in contour from each other, the purpose of which is to mold the tile in stages, from the approximate shape thereof, to the finished article.

These rollers, by their spindles are so mounted in their respective bearings 33, 34, 35 and 36, within their frame 36A that they may be adjustably and slidably moved in a vertical manner by the respective companion screws or studs 37, 38, 39 and 40, to and from the mold to compensate for varying thicknesses thereof and also to compensate for wear thereto.

It is of course to be understood that I may employ any number of each or either of the aforementioned rollers for the herein purposes. These rollers are placed in a position transversely to that of the standard frame 10 and may be operated through and by any approved and suitable means, such as for example, the pulley 41, transmitting such motion to toothed gearing 42 or the like.

From the finishing roller the mold frame 13 and therein molded tile moves under an end trimming plate 43 and side cutting arms 44, and makes pressing contact with the lever arm 45 which is pivoted at 46, to the aforesaid standard frame 10, and in moving forward, said arm causes its opposite end to move in a reverse direction and make pressing contact against an adjustable pin 47. The latter is attached to the end of a rod 48 which is supported in guides 49 and is adapted to reciprocate in a direction lengthwise to the main standard frame. Attached to the rod 48 is a bell-crank shaped lever arm 50 pivoted at 51 to the aforesaid main standard frame 10. This lever arm is attached through its opposite end to a shifting rod 52.

Upon the aforesaid mold frame 13 making contact against the lever arm 45, the rod 48 is caused to move in a reverse direction to that in which the mold frame is travelling, said action causes the bell-crank lever arm 50 to move the shifting rod 52 and disengage driving pinions or the like contained in the gear box 53. Upon such being completed the mold frame 13 is brought to rest. Attached lengthwise to the underside of the mold frame 13 is a toothed rack 54 which engages with a series of toothed pinions 55 mounted on spindles 56 and positioned transversely to the main standard frame 10. These pinions (by their spindles) receive motion through bevel pinions 57 and shafting 58 from a series of pinions or gear wheels 59 driven from the gear box 53. By manually depressing a foot pedal 61 connected by levers 62 to rod 63 and attached to plate 64, the rod 63 (comprising a square shaft in like shaped guides 63A) moves in an upward direction causing the plate 64 to strike the underside of the mold plate 15A thereby lifting the molded tile from its studs 15, through the side cutting arms 44, which latter trim the sides of the tile to the required width and at the same time causing the front end of the tile to press against the curved end trimming plate 65 which smoothes said end of the tile to a rounded shape, and when in the fully raised position, a pawl on the shaft of the end trimming plate engages with a catch 66 attached to the main frame, thus retaining the end trimming plate in its upwardly raised position.

During this lifting operation the back of the tile is pressed against an end plate 67 shaped so as to guide the tile upwards to the fully raised position; side stops 68 being provided to prevent any side movement. At the end of this upward movement the tile comes against a back shield 70, same being a vertical plate running transversely to the machine, and connected to a pivotal rod 71 moving in brackets 72 on the main frame, and shaped on its lower edge to conform to the shape of the tile being molded; said pivotal rod is provided with a counter-balanced weighted arm 71A.

The back ridge of the tile is then molded thereon manually (by means of a knife or trowel from material contained in a box 73 positioned against the end plate 67) between the guides therefor comprising the back-shield 70 and the said end plate 67. The back-shield 70 is then swung over and back, allowing the finished tile to be lifted clear, and after being surface-coloured or otherwise as may be desired, is placed in the drying rack.

The foot pedal 61, is then released, thus allowing the lifting rod to fall back into position and the end trimmer wiped clean and the catch released, thus allowing it to fall back into position ready for the next tile. During the downward movement of the foot pedal 61, same makes pressing contact against a pivoted lever 74 connected to the gear lever arm 45 by cable 75 or the like which passes over a small pulley 76, thus moving the shifting rod to pull gear pinions into the reverse gear, causing the mold frame 13 to move back towards the loading end of the machine where it engages the gear lever 45A, moving it straight through in the forward gear under the plate holder hopper, whereupon the herein series of operations are repeated.

Further, the operative rollers and thereto associated members may be provided with a casing 77, having a therein inspection door 78.

Furthermore, although the herein invention has been described with reference to the manufacture of tiles, it is to be understood that same may also be employed for the molding and manufacture of slabs, bricks and analogous purposes.

What I claim as my invention, and desire to secure by Letters Patent is:—

1. In a machine of the type set forth, the combination of a supporting frame, a mold frame slidably mounted therein, a renewable mold plate, means for holding said plate in said mold frame in position to receive cementitious material, at least one shaped ramming roller, a shaft on which said roller is mounted eccentrically, a shaped finishing roller, and a shaft on which said finishing roller is mounted concentrically.

2. In a machine for molding tiles and similar articles, the combination of a main frame, a mold frame mounted to move longitudinally thereof and carrying means for supporting a mold plate, a plurality of rollers of relatively different shapes respectively approximating and conforming in contour with that of the finished articles, said rollers being mounted in the main frame at intervals in the length thereof in positions to act successively on cementitious material on the mold plate as the mold frame is moved longitudinally of the main frame, and means for rotating said rollers in relatively different directions with respect to the direction of movement of the mold frame.

3. In a machine for molding tiles and similar articles, the combination of a main frame, a mold frame mounted to move longitudinally thereof and carrying means for supporting a mold plate, a pair of ramming rollers each of a shape approximating that of the finished articles and mounted rotatably in the main frame to act successively on cementitious material on the mold plate during the movement of the mold frame, said rollers being eccentric to their axes of rotation, means for rotating one of said rollers in the direction of movement of the mold frame and for rotating the other of said rollers in the opposite direction, a finishing roller of a shape conforming with that of the finished articles and mounted rotatably in the main frame to act on the material on the mold plate subsequent to the action of the ramming rollers thereon, the finishing roller being concentric with its axis of rotation, and means for rotating the finishing roller.

4. In a machine for molding tiles and similar articles, the combination of a main frame, a mold frame mounted to move longitudinally thereof and carrying means for supporting a mold plate, a pair of ramming rollers each of a shape approximating that of the finished articles and mounted rotatably in the main frame to act successively on cementitious material on the mold plate during the movement of the mold frame, said rollers being eccentric to their axes of rotation, means for rotating one of said rollers in the direction of movement of the mold frame and for rotating the other of said rollers in the opposite direction, a forming roller of a shape approximating that of the finished articles and rotatably mounted in the main frame to act on the material on the mold plate subsequent to the action of the ramming rollers thereoon, said forming roller being concentric with its axis of rotation, a finishing roller of a shape conforming with that of the finished articles and mounted rotatably in the main frame beyond the forming roller to act on the material on the mold plate subsequent to the action of the ramming and forming rollers thereon, the finishing roller being concentric with its axis of rotation, and means for rotating the forming and finishing rollers.

5. In a machine for molding tiles and the like, the combination of a supporting frame, a mold frame slidably mounted therein, a renewable mold plate having means for adjustably holding it in the mold frame at different heights to vary the thickness of the tile and compensate for wear between said frames, and a lifting rod for said mold plate, said mold frame having a gap therein to allow the passage therethrough of said lifting rod, and the mold frame having front and rear ends, the upper edges of which are of a contour which conforms with the upper face of the tile to be formed therein.

6. In a machine for molding tiles and the like, the combination of a main frame, a mold frame, a mold plate of the shape of the lower face of the tile to be formed thereon and carried by the mold frame, shoes on the under side of the mold frame, side rails mounted within the main frame and coacting with said shoes to support the mold frame for movement in the main frame, a toothed rack also on the under side of the mold frame, pinions mounted at intervals in the length of the main frame in positions to mesh with the rack on the mold frame, a power shaft, and bevel gearing connecting said pinions to said power shaft to impart sliding movement to the mold frame along said side rails.

7. In a machine of the type set forth, the combination of a main frame, a mold frame slidably mounted therein and adapted to receive a mold plate thereon, a holder at one end of the machine provided with toothed wheels having prongs to retain a supply of mold plates therein, and a trip lever for intermittently rotating said toothed wheels to singly release the mold plates and feed them to the mold frame.

8. In a machine of the type set forth, the combination of a main frame, a mold frame slidably mounted therein and carrying a mold plate, a hopper for holding cementitious material and having a pivoted door for feeding the material therefrom onto the mold plate on the mold frame, a pivoted lever operative by the mold frame and active on said pivoted door to open it, and a conveyor for initially supplying cementitious material to said hopper.

9. In a machine for molding tiles and similar articles, the combination of a main frame, a mold frame slidably mounted therein, and carrying a mold plate, a hopper at one end of the machine for feeding cementitious material to the mold plate on the mold frame, trimming plates and cutting arms positioned at the opposite end of the machine, a depressible foot pedal, a head plate operatively connected to said pedal to be raised thereby and positioned beneath the mold plate in the mold frame for lifting the same therefrom, a curved end trimming plate for the tile, a pawl for retaining said curved trimming plate in a raised position, a lever operable by said foot pedal, a cable operative by said lever, and operating means for the slidable mold frame including reverse means controlled by said cable for returning the mold frame to the material feeding end of the machine.

10. In a machine for molding tiles and similar articles, the combination of a supporting frame, a feed hopper at one end of the machine to contain cementitious material, a mold frame slidable in the supporting frame and carrying a mold plate to receive cementitious material from said hopper, operating means for sliding the mold frame in the supporting frame and for bringing the mold frame to rest at the discharge end of the machine, an end plate at the discharge end of the machine, and a back-shield pivotally mounted at the discharge end of the machine adjacent to said end plate and cooperative with said end plate to form a retaining wall for the molding of the back ridge on the tile.

WILLIAM GEOFFREY McCOMBE.